(12) United States Patent
Zoucha et al.

(10) Patent No.: US 9,282,061 B1
(45) Date of Patent: Mar. 8, 2016

(54) SYSTEMS AND METHODS FOR HANDLING ARP MESSAGES IN MODULAR NETWORK DEVICES

(75) Inventors: Jacqueline M. Zoucha, Sunnyvale, CA (US); Richard Paul King, Madison, AL (US); Roger Loh, Glen Waverley (AU); Andrew T. Ruble, Elkmont, AL (US)

(73) Assignee: ADTRAN, Inc., Huntsville, AL (US)

( * ) Notice: Subject to any disclaimer, the term of this patent is extended or adjusted under 35 U.S.C. 154(b) by 1000 days.

(21) Appl. No.: 13/446,887

(22) Filed: Apr. 13, 2012

(51) Int. Cl.
*H04L 12/935* (2013.01)
*H04L 12/931* (2013.01)
*H04L 29/12* (2006.01)

(52) U.S. Cl.
CPC .............. *H04L 49/30* (2013.01); *H04L 49/351* (2013.01); *H04L 61/6013* (2013.01); *H04L 49/3009* (2013.01)

(58) Field of Classification Search
None
See application file for complete search history.

(56) References Cited

U.S. PATENT DOCUMENTS

| | | | |
|---|---|---|---|
| 6,603,769 B1 | 8/2003 | Thubert | |
| 6,728,793 B1 | 4/2004 | McRobert et al. | |
| 7,174,376 B1* | 2/2007 | Daruwalla | 709/223 |
| 7,664,110 B1* | 2/2010 | Lovett et al. | 370/392 |
| 2004/0213234 A1* | 10/2004 | Koch et al. | 370/392 |
| 2007/0153738 A1 | 7/2007 | Barker, Jr. et al. | |
| 2007/0259700 A1 | 11/2007 | Meier et al. | |
| 2008/0195700 A1 | 8/2008 | Jonsson | |
| 2010/0080227 A1 | 4/2010 | Kang | |
| 2010/0115113 A1* | 5/2010 | Short et al. | 709/228 |
| 2011/0228755 A1 | 9/2011 | Seok | |

* cited by examiner

*Primary Examiner* — Hassan Phillips
*Assistant Examiner* — Saba Tsegaye
(74) *Attorney, Agent, or Firm* — Maynard Cooper & Gale, P.C.; Jon E. Holland (57) ABSTRACT

A system for handling address resolution protocol (ARP) messages has a plurality of communication modules for communicating via a network. Each such communication module has a separate link layer address (e.g., MAC address). Control logic in communication with each of the modules serves as an ARP proxy for the modules. Rather than using its own link layer address in the overhead of the ARP messages, the control logic uses the link layer addresses of the communication modules, thereby causing the network to learn these link layer addresses during ARP processing. Therefore, once ARP messaging between a communication module and a remote network device has been performed, the network has established a data path between the communication module and the remote network device, thereby helping to prevent or reduce message flooding when the two devices begin to communicate.

29 Claims, 5 Drawing Sheets

SYSTEMS AND METHODS FOR HANDLING ARP MESSAGES IN MODULAR NETWORK DEVICES

RELATED ART

In network communications, a network device often discovers a network layer address, such as for example an Internet Protocol (IP) address, of a remote device with which the network device is to communicate. However, in some situations, depending on the protocols used for communication, another address associated with the remote device may need to be discovered before communication can successfully occur. As an example, Ethernet protocols are based on media access control (MAC) addresses. If a network device is only aware of the IP address of a remote device, the network device needs to discover the MAC address of the remote device before successful communication with the remote device can occur through an Ethernet network.

Address resolution protocol (ARP) is a network protocol that has been developed to allow for resolution of network layer addresses into link layer addresses. To resolve a network layer address, such as an IP address, into a link layer address, such as a MAC address, a network device (referred to as "requesting device" in this context) transmits an ARP request that includes the IP address for which address resolution is being sought. The overhead of the ARP request includes a source MAC address identifying the requesting device, and the requesting device inserts its IP address and MAC address into the payload of the ARP request. The payload of the ARP request also specifies the IP address of the remote device, referred to as "target device" in this context, for which resolution is being requested.

Upon receiving the ARP request, the target device or a proxy on behalf of the target device transmits an ARP reply, which indicates the MAC address to be used for communication with the target device. Further, the overhead of the ARP reply includes a destination MAC address identifying the requesting device. Based on at least the destination MAC address of the ARP reply, the nodes of the network transmit the ARP reply to the requesting device. Once the ARP request and ARP reply have been successfully communicated, the requesting device is aware of the MAC address to be used for communicating with the target device and, therefore, may begin sending data messages to the target device through an Ethernet network.

Before a requesting device begins to communicate with a target device, it is sometimes the case that the nodes of the network have not learned the MAC address of the requesting device and/or the target device. If a network node receives a message having an unknown destination MAC address, then the network node typically floods the message to all of its ports, except for the port from which the message was received on ingress to the node. Eventually, the node should receive a message transmitted from the device identified by the unknown MAC address such that the node learns this MAC address. Specifically, the node updates its forwarding table to map the MAC address to the port from which the message was received. After learning the MAC address, if the node receives another message destined for same MAC address, the node does not flood the message but rather forwards it to the port that has been mapped to such MAC address. However, until the MAC address is learned by the node, it floods messages destined for such MAC address thereby causing network congestion. In general, it would be desirable to reduce or mitigate the effects of the network congestion that occurs from message flooding.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for handling address resolution protocol (ARP) messages in modular network devices. In one exemplary embodiment, a modular network apparatus has a plurality of communication modules for communicating via a network. Each such communication module has a separate link layer address, such as a media access control (MAC) address. Control logic in communication with each of the modules serves as an ARP proxy for the modules. Rather than using its own link layer address in the overhead of the ARP messages, the control logic uses the link layer addresses of the communication modules, thereby causing the network to learn these link layer addresses during ARP processing. Therefore, once ARP messaging between a communication module and a remote network device has been performed in order to resolve a network layer address into a link layer address, the network has established a data path between the communication module and the remote network device, thereby helping to prevent or reduce message flooding when the two devices begin to communicate.

In the above example, message flooding likely occurs during an ARP session as the network nodes are learning the link layer addresses of the communication module and/or the remote network device. However, transmissions during ARP messaging are usually more sporadic relative to transmissions that may occur during data communication. For example, when a requesting a device transmits an ARP request for a particular target device, it often waits for a period of time for an ARP reply before generating a new ARP message destined for the same target device. Thus, relatively few ARP messages are flooded before the network nodes learn the link layer addresses of the requesting device and/or target device.

Data communication, on the other hand, is usually more constant or sometimes bursty in nature such that a large number of messages may be transmitted from a source to a destination in a short amount of time. Thus, if the destination MAC address is unknown to the network, a relatively large number of messages for a particular destination may be communicated and flooded before such MAC address is learned. By allowing the network to learn the link layer addresses of a source and a destination based on the ARP messages when an ARP proxy is being used for the source and/or destination, the amount of flooding that occurs in the network can be reduced.

Figure 1:
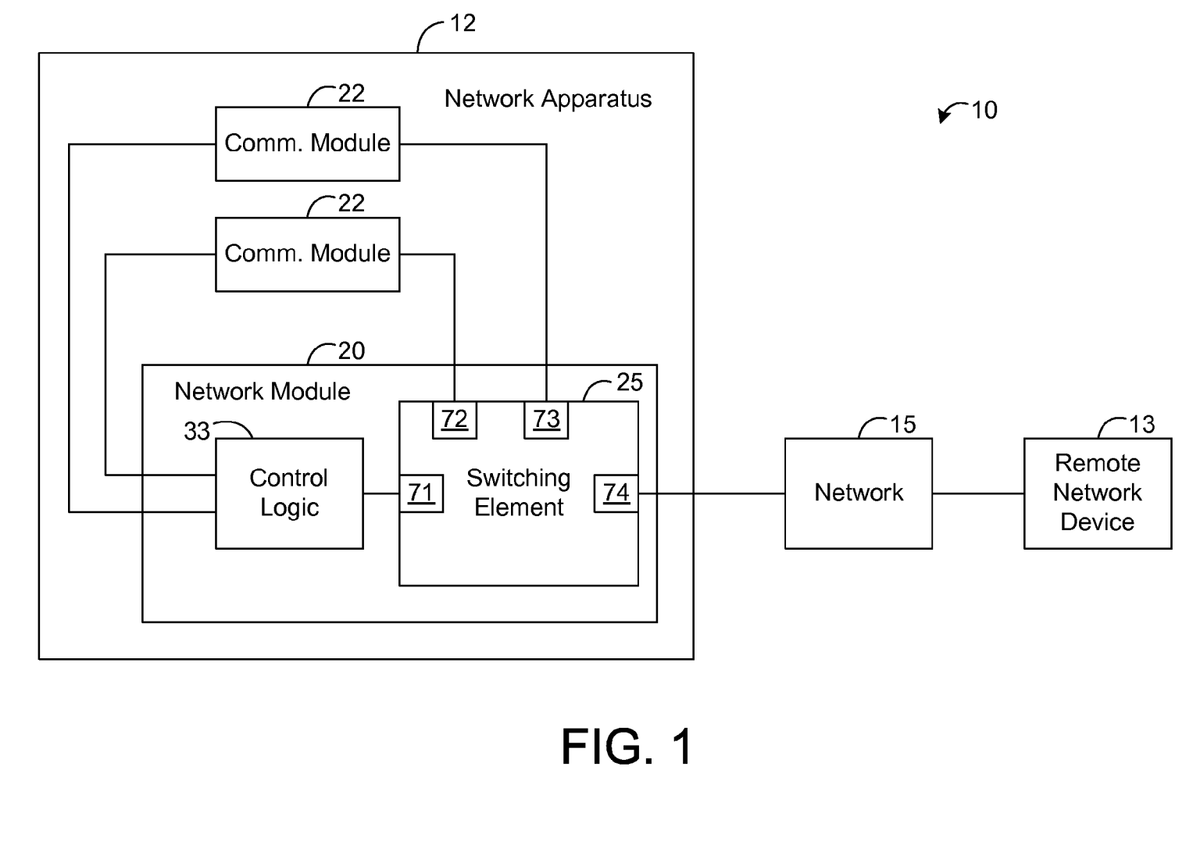
FIG. 1 is a block diagram illustrating an exemplary embodiment of a communication system.

FIG. 1 depicts an exemplary embodiment of a communication system 10. In the exemplary embodiment depicted by FIG. 1, a network apparatus 12 and a remote network device 13 are both coupled to and communicate with a network 15. In one exemplary embodiment, the network 15 is an Ethernet network configured to communicate frames in accordance with Ethernet protocols, but other types of networks using other types of protocols are possible in other embodiments.

As shown by FIG. 1, the network apparatus 12 is modular and, in particular, has a network module 20 interfaced with a plurality of communication modules 22. Each module 20 and 22 has a respective printed circuit board (PCB) on which components of the module reside. Further, each communication module 22 is pluggable in that it may be plugged into the network apparatus 12 and/or removed from the apparatus 12 when desired such that the number of communication modules 12 may change over time. For simplicity of illustration, FIG. 1 shows two communication modules 22, but other numbers of communication modules 22 are possible in other embodiments.

Each communication module 22 is configured to communicate with the network 15 through a network switching element 25, such as a switch or a router. In one exemplary embodiment where Ethernet protocols are used for communication with the network 15, the switching element 25 is implemented as an Ethernet switch, which makes forwarding decisions based on media access control (MAC) addresses and virtual local area network (VLAN) tags of messages. However, in other embodiments, other types of switching elements and other protocols are possible. Though other protocols may be used, it will be assumed hereafter unless otherwise stated that the switching element 25 and the network 15 are configured for Ethernet communication.

As further shown by FIG. 1, the network module 20 has control logic 33 for generally controlling the network apparatus 12, as will be described in more detail hereafter. The control logic 33 is coupled to and communicates with the Ethernet switching element 25 and each of the communication modules 22. The control logic 33 may be implemented in hardware, software, firmware, or any combination thereof. In an exemplary embodiment illustrated in FIG. 2, the control logic 33 is implemented in software and stored in memory 41 of the network module 20.

Note that the control logic 33, when implemented in software, can be stored and transported on any computer-readable medium for use by or in connection with an instruction execution apparatus that can fetch and execute instructions. In the context of this document, a "computer-readable medium" can be any means that can contain or store a program for use by or in connection with an instruction execution apparatus.

Figure 2:
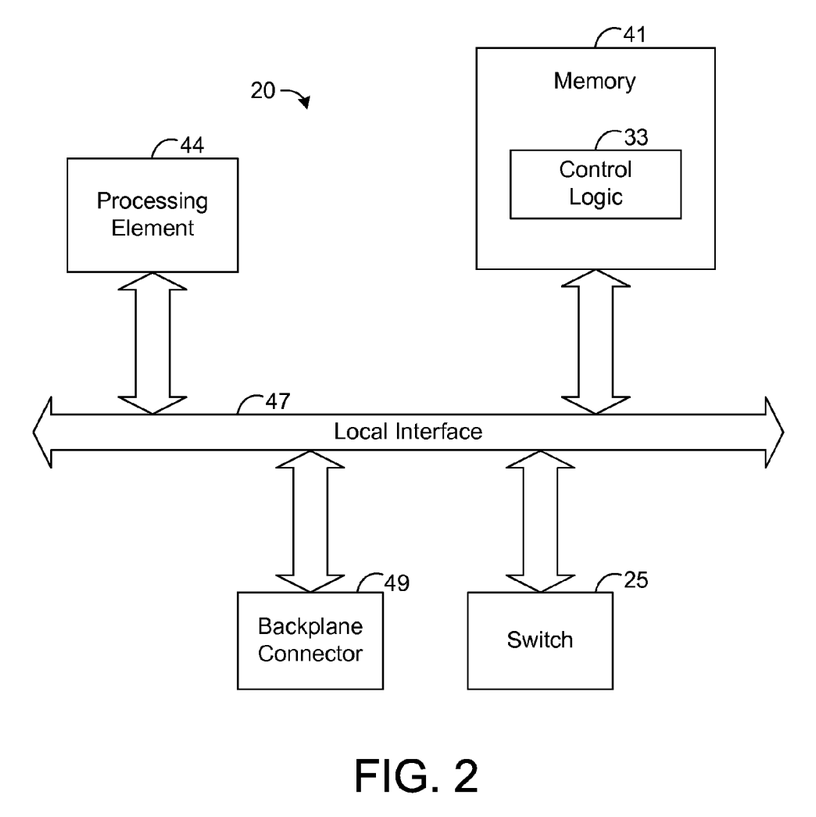
FIG. 2 is a block diagram illustrating an exemplary embodiment of a network module, such as is depicted by FIG. 1.

The exemplary embodiment of the network module 20 depicted by FIG. 2 comprises at least one conventional processing element 44, such as a digital signal processor (DSP) or a central processing unit (CPU), that communicates to and drives the other elements within the system 20 via a local interface 47, which can include at least one bus. In one exemplary embodiment, the local interface 47 is coupled to a backplane connector 49 that interfaces the module 20 with a backplane (not shown in FIG. 2) of the network apparatus 12, as will be described in more detail hereafter.

Figure 3:
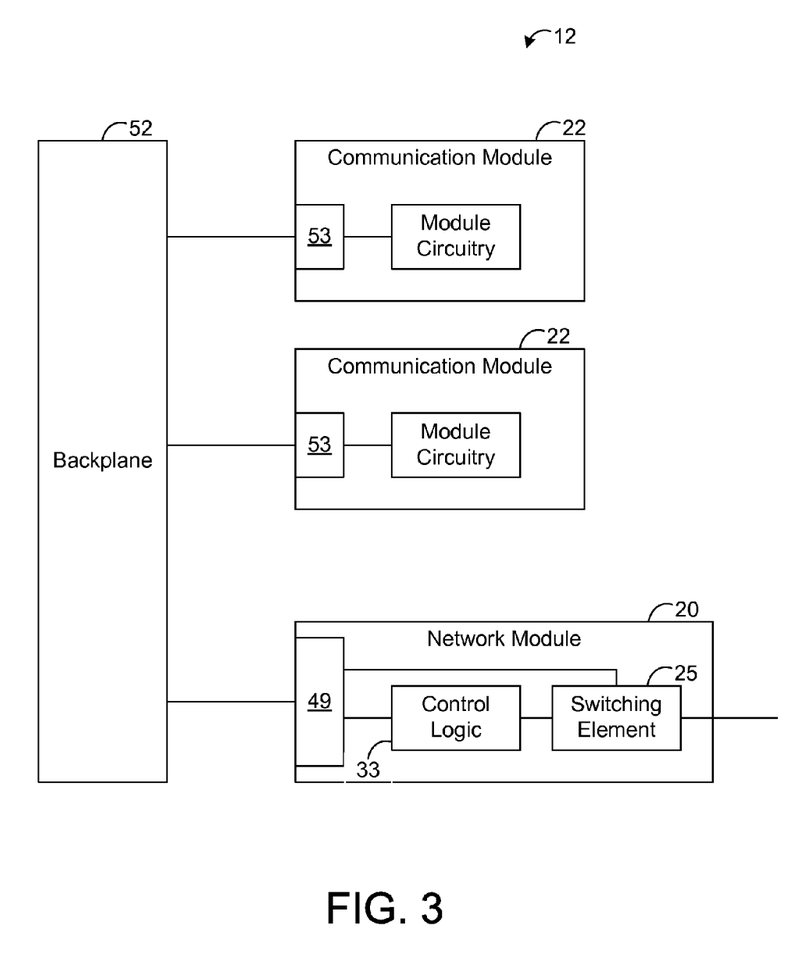
FIG. 3 is a block diagram illustrating an exemplary embodiment of a network apparatus, such as is depicted by FIG. 1.

In one exemplary embodiment, the network apparatus 12 comprises a chassis (not shown) having a plurality of slots for holding the modules 20, 22. Specifically, each module 20, 22 is inserted into a respective slot of the chassis and is electrically connected to a chassis backplane 52, as shown by FIG. 3. In this regard, the backplane connector 49 of the network module 20 is removably plugged into the backplane 52, and each of the communication modules 22 has a respective backplane connector 53 that is removably plugged into the backplane 52, which electrically connects each module 20, 22 to the other modules of the network apparatus 12. In one exemplary embodiment, the control logic 33 is separately connected to the backplane 52 relative to the switching element 25 such that the control logic 33 can communicate with any of the communication modules 22 across the backplane 52 without having to communicate through the switching element 25. Further, the switching element 25 may communicate with any of the communication modules 22 across the backplane 52 without having to communicate through the control logic 33.

Figure 4:
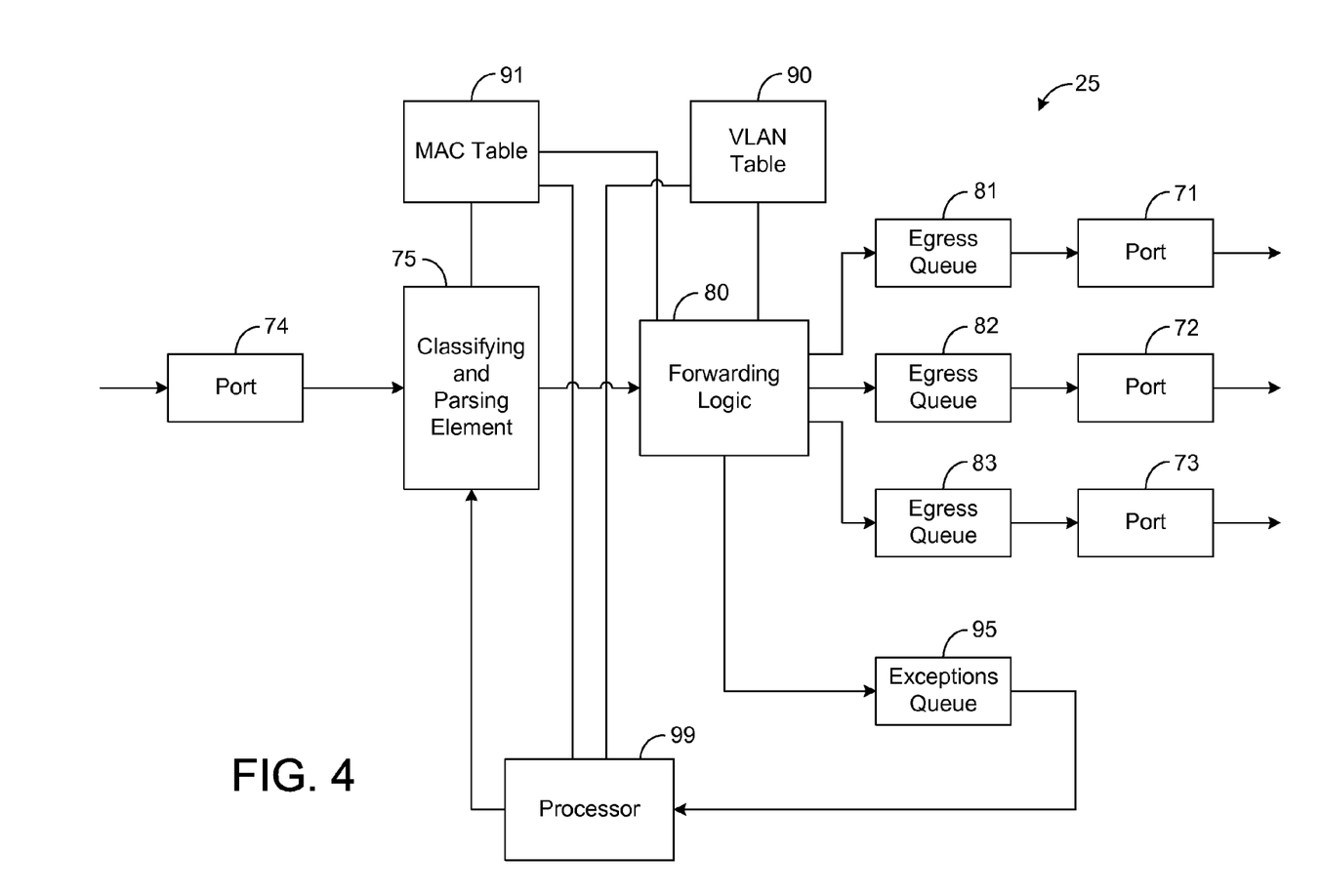
FIG. 4 is a block diagram illustrating an exemplary embodiment of a network switching element, such as is depicted by FIG. 1.

FIG. 4 depicts an exemplary embodiment of the switching element 25. The communication modules 22, control logic 33, and the network 15 are respectively coupled to a plurality of ports 71-74, which receive data traffic. Note that FIG. 4 shows a data flow for messages received by the port 74. A similar flow may exist for messages received by the other ports 71-73. As an example, the port 74 may have an egress queue (not shown in FIG. 4) for queuing traffic from any of the other ports 71-73, when such traffic is to be forwarded to the port 74. For illustrative purposes the flow of data within the switching element 25 will be described below assuming that messages are received by the port 74, but it should be noted that messages may be received by any of the other ports 71-73 and similarly forwarded. In addition, FIG. 1 shows each of the control logic 33, communication modules 22, and network 15 as being coupled to a single port 71-74, but any such components (e.g., network 15) may be coupled to multiple ports in other embodiments.

There are generally three types of messages: broadcast, multicast, and unicast. A broadcast message is generally transmitted from a source to all destinations of a VLAN, if the broadcast message specifies a VLAN, or all destinations of a network, if no VLAN is specified. A multicast message is generally transmitted from a source to a group of destinations, and a unicast message is transmitted from a source to a destination having an address that is specified in the unicast message.

Each received message (e.g., frame when the messages are in accordance with Ethernet protocol) is parsed and classified by a classifying and parsing element 75 to determine metadata indicative of various attributes of the message, such as MAC addresses, VLAN tags, message type, and a port identifier for the port 74 that receives the message on ingress to the switching element 25. For example, the element 75 may determine metadata indicating the destination and/or source MAC address of the message and whether the message is a unicast, multicast, or broadcast message. For messages carried by VLANs, referred to hereafter as "VLAN messages," the metadata typically includes at least one VLAN tag for the message.

In general, when a message is classified as broadcast or multicast, the forwarding logic 80 floods the message. Specifically, if there is no VLAN tag in a broadcast or multicast message received by the port 74, the forwarding logic 80 forwards the message to each of the egress queues 81-83 such that the message is transmitted from each port 71-73 except the one (i.e., port 74 in this example) that received the message on ingress to the switching element 25. If there is a VLAN tag in the message, the forwarding logic 80 forwards the message to the egress queues feeding ports that are members of the VLAN such that the message is transmitted from each port that is a member of the VLAN except the one that received the message on ingress to the switching element 25.

Note that a VLAN table 90 indicates which ports 71-74 are members of which VLANs. In this regard, the VLAN table 90 of the switching element 25 has a plurality of entries in which each entry defines a mapping for associating at least a VLAN tag with a port identifier. In particular, each entry of the VLAN table 90 typically stores a VLAN tag, such as an S-tag or a C-tag, identifying a particular VLAN and at least one port identifier identifying at least one port 71-74 that is a member of the VLAN. When a VLAN multicast or broadcast message is received, the forwarding logic 80 uses the message's VLAN tag as a key to lookup in the VLAN table 90 the port identifiers of ports that are members of the VLAN. The forwarding logic 80 then forwards the message to the egress ports feeding such ports except for the port that received the message on ingress. Thus, VLAN multicast or broadcast messages are forwarded based on the VLAN table 90.

For a unicast message, the switching element 25 generally forwards the message only to the port 71-74 mapped by a MAC table 91 to the message's destination MAC address or other information in the message's header. In this regard, the MAC table 91 of the switching element 25 has a plurality of entries in which each entry defines a mapping for associating at least a MAC address with a port identifier. In particular, each entry comprises a MAC address identifying a network resource to which messages may be sent. The entry also comprises a port identifier that uniquely identifies a port 71-74 of the switching element 25, thereby mapping such port to the MAC address in the same entry. The entry may also comprise a VLAN tag on which forwarding decisions can be made. Thus, if a particular resource communicates via four different VLANs, then the resource's MAC address may be included in at least four entries of the MAC table 91 in which each entry comprises a respective VLAN tag.

Moreover, upon receiving a unicast message, the forwarding logic 80 searches the MAC table 91 for an entry corresponding to the message using the message's metadata. Specifically, the forwarding logic 80 searches the MAC table 91 for an entry having a MAC address and VLAN tag (if the message has a VLAN tag) respectively matching the destination MAC address and VLAN tag of the message. If there is no VLAN tag in the received message, then the forwarding logic 80 searches the MAC table 91 based on just the destination MAC address. In particular, the forwarding logic 80 uses the destination MAC address and the VLAN tag (if any) of the received message as keys to lookup in the MAC table 91 the port identifier correlated with (e.g., in the same entry as) the message's destination MAC address and VLAN tag (if any). If there is a corresponding entry in the MAC table 91 resulting in a MAC table hit, the message (which in this case is referred to as a "known" unicast message) is forwarded to an egress queue to await transmission from the identified port. Thus, known unicast messages are forwarded by the forwarding logic 80 based on the MAC table 91.

If there is no corresponding entry in the MAC table 91 resulting in a MAC table miss for the message's destination MAC address, then the forwarding logic 80 is configured to forward the message (referred to as an "unknown" unicast message) like a multicast or broadcast message. Thus, for an unknown unicast message having a VLAN tag, the forwarding logic 80 floods the message to all ports that are members of the VLAN, as indicated by the VLAN table 90, except for the port that received the message on ingress. In this regard, the forwarding logic 80 searches for the message's VLAN tag in the VLAN table 90 to determine a list (one or more) of port identifiers identifying which of the ports 71-74 are members of the message's VLAN. The forwarding logic 80 then forwards the message to each identified port by transmitting the message to each egress queue that is coupled to and feeds any of the identified ports.

At least some messages are trapped by the forwarding logic 80 so that their metadata are transmitted to an exceptions queue 95 to await processing by a processor 99. Note that there are a variety of reasons why a message might be trapped for processing by the processor 99. As an example, messages may be trapped in order to dynamically learn MAC addresses for the MAC table 91, referred to as "MAC learning."

In this regard, when a message is received by the switching element 25, the classifying and parsing element 75 searches the MAC table 91 for an entry corresponding to the message's source MAC address, VLAN tag, and ingress port. That is, the element 75 searches the MAC table 91 for an entry having a MAC address, VLAN tag, and port identifier respectively matching the source MAC address in the message's header, the VLAN tag in the message's header, and the port identifier identifying the port 71-74 that received the message on ingress to the switching element 25. If there is no such corresponding entry (e.g., the source MAC address is not found in the MAC table 91) resulting in a MAC table miss, the element 75 marks the message for exception so that the forwarding logic 80 traps the message by forwarding at least the message's metadata to the processor 99. Such a trap that occurs due to a MAC table miss related to the message's source MAC address, VLAN tag, and ingress port identifier is referred to herein as a "MAC learning trap."

Upon receiving the metadata of the trapped message from the exceptions queue 95, the processor 99 updates the MAC table 91 based on such metadata to add an entry for the message's source MAC address. In particular, the processor 99 adds an entry to the MAC table 91, and the entry correlates the message's source MAC address and VLAN tag (if included in the trapped message) with the port identifier identifying the port 72 that received the message on ingress to the switching element 25. Thus, over time, the MAC table 91 is populated with entries mapping MAC addresses (and VLAN tags in some cases) to port identifiers, and there is no need for the MAC table 91 to be provisioned. That is, the MAC addresses are dynamically learned so that provisioning of the MAC table 91 is unnecessary. In other examples, other reasons for trapping a message for further processing by the processor 99 are possible.

In one exemplary embodiment, referring to FIG. 1, the control logic 33 serves as an ARP proxy for the communication modules 22. In this regard, when a communication module 22 needs to resolve a network layer address, such as an IP address, of a target device (e.g., the remote network device 13 shown by FIG. 1) into a link layer address, such as a MAC address, the control logic 33 transmits an ARP request through the network 15 to the target device. In response to such ARP request, the target device or a proxy for the target device transmits an ARP reply indicating a MAC address to be used for communicating with the target device. Based on such reply, the communication module 22 discovers the MAC address to be used for communicating with the target device and thereafter communicates with such target device based on such MAC address.

When the switching element 25 receives from the network 15 an ARP request identifying one of the communication modules 22 as a target of such ARP request, the switching element 25 forwards the ARP request to the control logic 33, which is configured to transmit an ARP reply indicating the MAC address of the identified module 22. Thus, the source of the ARP request can discover the MAC address of the identified module 22.

By serving as an ARP proxy for the modules 22, it is unnecessary for each module 22 to include circuitry for handling ARP messages, and the complexity and/or cost of each communication module 22 can be reduced. Any increased cost of implementing the ARP handling at the network module 20 can be more than offset by the cost savings realized for multiple communication modules 22 such that the overall complexity and/or cost of the network apparatus 12 can be reduced by configuring the control logic 33 to serve as an ARP proxy for the communication modules 22.

However, the control logic 33 is configured to use the MAC addresses of the communication modules 22, instead of its own MAC address, as the destination and/or source addresses for the ARP messages. That is, the control logic 33 spoofs the network 15 such that it appears to the network 15 that the ARP messages are generated by the communication modules 22 when the ARP messages in fact originate from the control logic 33. Thus, the ARP proxy function provided by the control logic 33 is transparent to the network 15.

Figure 5:
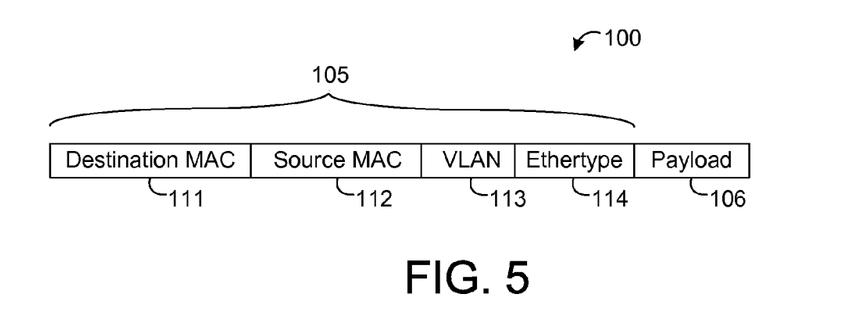
FIG. 5 is a block diagram illustrating an exemplary frame format for a message communicated through a network, such as is depicted by FIG. 1.

As an example, FIG. 5 depicts an exemplary ARP message 100, such as an ARP reply, that is in accordance with Ethernet protocol. An ARP reply is a unicast message and, thus, includes a destination MAC address, as will be described in more detail below. As shown by FIG. 5, the message 100 has a header 105 and payload 106. The header 105 has overhead information that is used by the network 15 to appropriately forward the message through the network 15, and the payload 106 is typically passed through the network 15 unchanged. Such payload 106 is not typically used by the network 15 for forwarding decisions.

The header 105 comprises various fields 111-114 that include information for making forwarding and/or other control decisions in the network 15. The exemplary header 105 of FIG. 5 comprises a destination MAC field 111, a source MAC field 112, in some cases a VLAN field 113, and an Ethertype field 114.

The destination MAC field 111 generally indicates the destination MAC address for the message 100 or, in other words, the MAC address of the device that is destined to receive the message 100. The source MAC field 112 generally indicates the source MAC address for the message 100 or, in other words, the device from which message originates. By inserting the MAC address of a communication module 22 in the source MAC field 112 of a message actually transmitted by the control logic 33, the control logic 33 spoofs the network 15 such that it appears that the message originated from the identified communication module 22.

The VLAN field 113 indicates the VLAN tag identifying the VLAN that is to carry the message 100. Note that it is unnecessary for a message 100 to be carried by a specific VLAN. In such case, the VLAN field 113 is omitted from the message 100.

As known in the art, the Ethertype field 114 includes various codes defined by Ethernet standards that indicate various attributes about the frame format of the message 100. The codes generally indicate the type of information that follows the Ethertype field. The Ethertype field 114 includes a code indicating that the following information in the message 100 is payload 106, and in the case of an Ethernet ARP reply, the Ethertype field 114 also indicates the message type of the message 100. Hence, the Ethertype field 114 can be analyzed to determine that the message 100 is an ARP reply.

Note that an ARP request has the frame format shown by FIG. 5 and, thus, has a destination MAC field 111, a source MAC field 112, a VLAN field 113, an Ethertype field 114, and payload 106. The ARP request, however, is a broadcast message and a destination MAC address is not inserted into the destination MAC field 111. As an example, a predefined value unique to broadcast messages may be inserted into the destination MAC field 111, thereby indicating that the request is a broadcast message to the nodes of the network 15.

The network 15 preferably has nodes that are configured to forward messages based on the destination MAC addresses and/or VLAN tags, similar to the techniques for forwarding messages described above for the switching element 25. In fact, the network 15 may comprise switches similar to the one shown by FIG. 4. Such nodes may perform MAC learning, as described above for the switching element 25. By using the MAC addresses of the communication modules 22 when serving as an ARP proxy for these modules 22, the control logic 33 causes the network nodes to learn the MAC addresses of the communication modules 22 during ARP processing. Thus, once a network layer address, such as an IP address, has been resolved into a link layer address, such as a MAC address, through ARP processing on behalf of a communication module 22, such module 22 may begin communicating through the network 15 without the network 15 having to learn its MAC address, thereby preventing at least some message flooding that would otherwise result in the network 15.

It should be noted that spoofing the network 15 by using another device's MAC address as the source MAC address for a message not originating from such other device, as described above, often results in communication problems, thereby discouraging the use of such practice in many applications. However, the switching element 25 is preferably designed to control the effects of the control logic 33 spoofing the network 15 with the MAC addresses of the communication modules 22 such that the proxy function performed by the control logic 33 is transparent to the network 15 and does not result in communication problems or errors.

For example, in one exemplary embodiment, the switching element 25 is configured to distinguish ARP messages from normal data messages and to forward ARP messages received from the network 15 to the port 71 of the control logic 33 even if such ARP messages have destination MAC addresses identifying the communication modules 22. Forwarding ARP messages to the port 71 of the control logic 33 allows such logic 33 to receive the ARP messages even though each ARP message identifies a respective communication module 22 as its destination, thereby facilitating the ARP proxy function implemented by the control logic 33. Data messages on the other hand are forwarded based on the mappings in the MAC table 91 and/or VLAN table 90 of the switching element 25. Thus, a data message having a destination MAC address identifying a communication module 22 is forwarded to the port 72 or 73 coupled to such module 22, but an ARP message having the same destination MAC address is instead forwarded to the port 71 that is coupled to the control logic 33.

Further, to prevent the ARP messages from affecting the forwarding decisions for the data messages, station movement is disallowed towards the port 71 that is coupled to the control logic 33. In this regard, in the context of an Ethernet switch, station movement generally refers to the process of updating the MAC table 91 to change which port 71-74 of the switching element 25 is mapped to the MAC address of a newly received message. As described above, MAC learning is used to populate the MAC table 91 with the mappings for making forwarding decisions. Once a MAC address has been learned (i.e., a mapping is created for mapping the MAC address to a particular port 71-74), the mapping is often updated if a message having a matching source MAC address is received by a port other than the one to which the MAC address is mapped by the MAC table 91. That is, the port identifier associated with the MAC address in the MAC table 91 is changed to identify the port from which the message was received on ingress to the switching element 25. However, if such station movement is allowed for the ARP messages handled by the control logic 33, then the ARP handling performed by the control logic 33 would result in the switching element 25 updating its MAC table 91 based on the ARP messages such that the MAC addresses of the communication modules 22 are mapped to the port 71 of the control logic 33. In such case, data messages would be incorrectly forwarded to the control logic 33 after the ARP processing.

To prevent such an effect, station movement is disallowed towards the port 71 coupled to the control logic 33 such that once a MAC address has been learned, the MAC table 91 will not be later updated to map the learned MAC address to the port identifier of the port 71 coupled to the control logic 33. Station movement, however, is allowed for other ports 72-74 of the switching element 25. Thus, if a communication module 22 having a particular MAC address is moved from one port 72 to another port 73, then the switching element 25 will eventually update the MAC table 91 to map such MAC address to the other port 73. However, when the switching element 25 receives from the control logic 33 an ARP message having a MAC address of a communication module 22 in the source MAC field 112, disallowing station movement towards the port 71 of the control logic 33 prevents the MAC table 91 from being updated based on such ARP message. Therefore, the port 73 to which the MAC address is mapped by the MAC table 91 is not changed even though it is not the same port 71 from which the ARP message was received.

On the other hand, if the switching element 25 receives from the control logic 33 a message having a source MAC address that has yet to be learned by the switching element 25 (i.e., an "unknown" MAC address), such as would occur when the control logic 33 transmits to the switching element 25 a message having its own MAC address in the source MAC field 112, the switching element 25 learns such MAC address by mapping it to the port identifier for the port 71 that is coupled to the control logic 33. Disallowing station movement towards the port 71 of the control logic 33 only prevents MAC addresses previously learned by the switching element 25 (i.e., "known" MAC addresses) from being mapped to such port 71.

For illustrative purposes, assume that a communication module 22 (referred to hereafter as the "new communication module" or "new module") is plugged into the backplane 52 and that this new communication module 22 is to communicate with a particular remote network device 13. In one exemplary embodiment shown by FIG. 6, the new communication module 22 is provisioned through the control logic 33.

Figure 6:
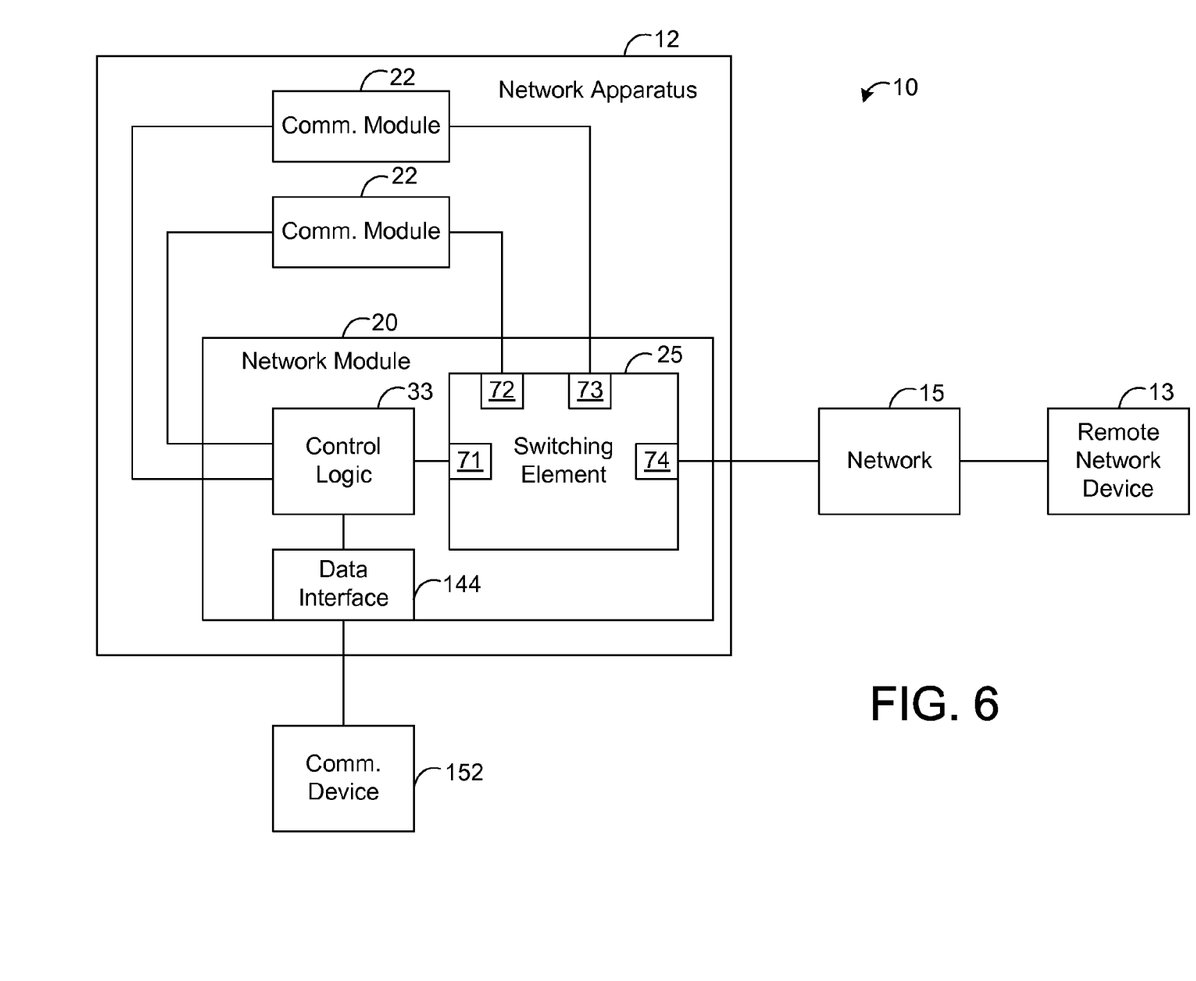
FIG. 6 is a block diagram illustrating an exemplary embodiment of a communication system.

In this regard, the network module 20 has a data interface 144 (e.g., a serial data interface, such as an RS-232 interface) to which a communication device 152, such as a lap-top or hand-held computer, can be connected. A technician provides inputs via the communication device 152 for provisioning the new communication module 22 in a desired manner.

The control logic 33 is configured to receive the inputs and to communicate with the new communication module 33 via the backplane 52 in order to provision the new communication module 22 according to the received inputs. For illustrative purposes, assume that such inputs indicate the IP address of the new communication module 22 and the IP address of a remote network device 13 with which the new communication module 22 is to communicate via a VLAN that is also identified by the user inputs. In such case, the control logic 33 is aware that the new communication module 22 needs ARP processing in order to enable communication with the remote network device 13. In addition to communicating with the new module 22 for provisioning, the control logic 33 also communicates with the new communication module 22 via the backplane 52 in order to discover the MAC address of the new module 22.

During provisioning, the control logic 33 communicates with the switching element 25 and provides the MAC address and IP address of the new communication module 22 and the VLAN tag identifying the VLAN that is to carry messages between the new communication module 22 and the remote network device 13. Specifically, the control logic 33 transmits to the switching element 25 at least one control message for configuring the switching element 25 to forward to the port 71 coupled to the control logic 33 ARP messages having (1) a destination MAC address or a target IP address identifying the new module 22 and (2) the foregoing VLAN tag.

After provisioning, the control logic 33 initiates an ARP session with the remote network device 13 on behalf of the new communication module 22. That is, the control logic 33 transmits an ARP request having a frame format similar to the one shown by FIG. 5, with the destination MAC field 111 set to indicate that the request is a broadcast message. The control logic 33 controls the Ethertype field 114 to indicate that the transmitted message is an ARP request, and the control logic 33 includes the IP address of the remote network device 13 and the MAC address of the new communication module 22 in the payload 106. The control logic 33 also inserts into the VLAN field 113 the VLAN identifier identifying the VLAN with which the new communication module 22 and the remote network device 13 are to communicate. Notably, rather than inserting its own MAC address into the source MAC field 112, the control logic 33 inserts the MAC address of the new communication module 22 into such field 112.

The ARP request is transmitted through the switching element 25 to the network 15. Since the ARP request is a broadcast message, such nodes flood the ARP request across the VLAN so that the it should eventually reach the remote network device 13 identified by the IP address in the payload 106 or an ARP proxy for such device 13. The nodes that receive the ARP request also learn the source MAC address. That is, each node that receives the ARP request updates its MAC table 91 in order to map the source MAC address (which identifies the new communication module 22) to the port identifier that identifies the port from which the ARP request is received on ingress to the node.

The remote network device 13 or its ARP proxy generates an ARP reply in response to the ARP request. Such ARP reply is a unicast message having a frame format according to the one shown by FIG. 5. In this regard, the Ethertype field 114 indicates that the message is an ARP reply. Further, the destination MAC field 111 has the destination address of the new module 22 (which is obtained from the ARP request), and the VLAN field 113 has the VLAN tag from the ARP request. Further, the MAC address of the remote network device 13 is included in the payload 106 of the ARP reply. If the ARP reply originates from the remote network device 13, its MAC address is also included in the source MAC field 112 of the reply's header 105.

Based on at least the destination MAC address in the field 111 and the VLAN tag in the field 113, the ARP reply is forwarded through the network 15 to the switching element 25. If the MAC address of the remote network device 13 is unknown to any of the nodes that receive the ARP reply and if the ARP reply originates at the remote network device 13 such that its source MAC field 112 includes the MAC address of the device 13, then such nodes learn this MAC address by mapping the source MAC address of the ARP reply to the port identifier that identifies the port from which the ARP reply is received on ingress to the node.

When the switching element 25 receives the ARP reply, the classifying and parsing element 75 determines that, based on the destination MAC address (which identifies the new communication module 22) of the field 111, the message type indicated by the Ethertype field 114, and the VLAN tag of field 113, the ARP reply is an exception that is to be forwarded to the port 71 coupled to the control logic 33. Thus, the element 75 controls the reply's metadata to mark it for forwarding to the port 71 of the control logic 33. Based on such metadata, the forwarding logic 80 refrains from performing a lookup of the MAC table 91 and instead forwards the reply to the egress queue 81 feeding the port 71 that is coupled to the control logic 33. Thus, the ARP reply is eventually received by the control logic 33.

The control logic 33 then communicates with the new communication module 22 across the backplane 52 to provide such module 22 the MAC address of the remote network device 13, as indicated by the ARP reply. At this point, the new communication module 22 is aware of the MAC address of the remote network device 13 and, thus, has sufficient information for transmitting data messages to the remote network device 13 through the network 15.

Notably, at this point, nodes of the network 15 along a path from the network apparatus 12 to the remote network device 13 have learned the MAC addresses of at least the new communication module 22. Thus, when the new communication module 22 and the remote network device 13 begin communicating after the ARP session described above for resolving the IP address of the remote network device 13 into a MAC address, the nodes of the network 15 recognize the MAC addresses of the messages from at least the new communication module 22 and, thus, refrain from flooding such messages helping to reduce congestion in the network 15.

Indeed, unlike an ARP session in which messages are communicated with relatively long delays in between, a data session is often constant or bursty in nature where a relatively large number of messages are transmitted successively in a short time period. Thus, if the MAC address of the new communication module 22 had not been learned by the network 15 during the ARP session, then a relatively large number of messages from the new communication module 22 likely would be flooded at the start of the data session until the nodes of the network 15 learn such MAC address based on the messages flowing in the data session. Accordingly, by using the MAC address of the new module 22 as the source MAC address in the header 105 of the ARP request, as described above, congestion in the network 15 is reduced.

Note that the MAC addresses of the remote network device 13 and the new communication module 22 can also be learned via an ARP session initiated by the remote network device 13. In such an example, the remote network device 13 or an ARP proxy for the device 13 transmits an ARP request having the IP address of the new communication module 22 in the payload 106. If the ARP request originates at the remote network device, then such message also has the MAC address of the device 13 in the source MAC field 112. Eventually, the ARP request is received by the switching element 25, and the classifying and parsing element 75 determines that, based on the message type indicated by the Ethertype field 114 and the VLAN tag of field 113, the ARP request is an exception that is to be forwarded to the port 71 coupled to the control logic 33. Thus, the element 75 controls the request's metadata to mark it for forwarding to the port 71 of the control logic 33.

Based on such metadata, the forwarding logic 80 refrains from performing a lookup of the MAC table 91 and instead forwards the request to the egress queue 81 feeding the port 71 that is coupled to the control logic 33. Thus, the ARP request is eventually received by the control logic 33.

The control logic 33 then forms an ARP reply, which includes the MAC address of the new communication module 22 in the source MAC field 112. Such ARP reply is transmitted through the switching element 25 and the network 15 to the remote network device 13 or its ARP proxy, which discovers the MAC address of the new communication module 22 from the reply.

In several embodiments described herein, the control logic 33 serves as a proxy for resolving IP addresses into MAC addresses. It should be emphasized that, in other embodiments, similar techniques can be used to resolve other types of network layer addresses into other types of link layer addresses.

Now, therefore, the following is claimed:

1. A modular network apparatus, comprising:
a plurality of pluggable communication modules, each of the pluggable communication modules configured to communicate with a network and having a respective link layer address, the plurality of pluggable communication modules including at least a first pluggable communication module and a second pluggable communication module;
a network switching element having a plurality of ports and at least one table for mapping link layer addresses to port identifiers that identify the plurality of ports, each of the pluggable communication modules coupled to a respective one of the plurality of ports, wherein at least one of the ports is coupled to the network, and wherein the network switching element is configured to forward messages between the plurality of ports based on the at least one table; and
at least one processing element programmed with control logic coupled to one of the ports of the network switching element and to the plurality of communication modules, the control logic configured to function as a proxy for the first and second pluggable communication modules for resolving network layer addresses into link layer addresses, the control logic configured to originate a first message for resolving a network layer address identifying a remote network device into a link layer address identifying the remote network device, the first message having a header comprising a field for a source address, wherein the control logic is configured to insert a link layer address identifying the first pluggable communication module into the field such that at least one node of the network learns the link layer address identifying the first pluggable communication module based on the first message.

2. The modular network apparatus of claim 1, wherein the network is an Ethernet network.

3. The modular network apparatus of claim 1, wherein the first message is an address resolution protocol (ARP) request.

4. The modular network apparatus of claim 1, wherein the first message is an address resolution protocol (ARP) reply.

5. The modular network apparatus of claim 1, wherein the link layer address identifying the first pluggable communication module is a media access control (MAC) address.

6. The modular network apparatus of claim 1, wherein the network switching element is configured to disallow station movement towards the port of the network switching element coupled to the control logic.

7. The modular network apparatus of claim 1, wherein each of the pluggable communication modules is inserted into a respective slot of a chassis and is electrically connected to a backplane of the chassis.

8. The modular network apparatus of claim 7, wherein the control logic is connected to the backplane and wherein the control logic is configured to communicate with each of the pluggable communication modules via the backplane.

9. The modular network apparatus of claim 1, wherein the network switching element is configured to receive a second message having a destination address identifying the first communication module, the second message for resolving a network layer address into a link layer address, and wherein the network switching element is configured to forward the second message to the port of the network switching element coupled to the control logic based on a message type indicated by the second message.

10. The modular network apparatus of claim 9, wherein the network switching element is configured to receive a third message having a destination address identifying the first communication module, and wherein the network switching element is configured to forward the third message to the port of the network switching element coupled to the first communication module based on the destination address of the third message.

11. The modular network apparatus of claim 9, wherein the network switching element is configured to disallow station movement towards the port of the network switching element coupled to the control logic.

12. The modular network apparatus of claim 11, wherein the network switching element comprises a classifying and parsing element configured to receive the second message, wherein the classifying and parsing element is configured to analyze the second message to determine the message type and wherein the classifying and parsing element is configured to determine that the second message is an exception based on the message type and mark metadata of the second message for forwarding to the port of the network switching element coupled to the control logic instead of a port of the network switching element coupled to the first communication module.

13. The modular network apparatus of claim 11, wherein the second message comprises a field indicating the message type.

14. The modular network apparatus of claim 11, wherein the control logic is configured to provide the first communication module with a source address from the second message.

15. The modular network apparatus of claim 1, wherein the at least one table comprises a media access control (MAC) table for mapping MAC addresses to the port identifiers.

16. The modular network apparatus of claim 15, wherein the at least one table comprises a virtual local area network (VLAN) table for mapping VLAN tags to the port identifiers.

17. The modular network apparatus of claim 1, wherein the network module comprises memory, and wherein at least a portion of the control logic is stored in the memory.

18. A communication system, comprising:
a communication module configured to communicate with a network, the communication module having a first media access control (MAC) address; and
a network module having a network switching element and programmed with control logic having a second MAC address, the control logic configured to function as an address resolution protocol (ARP) proxy for the communication module by communicating at least a first ARP message with a remote network device for resolving a network layer address identifying the remote network device into a MAC address identifying the remote network device, wherein the first ARP message has a header comprising a source MAC field indicating a source MAC address for the first ARP message, and wherein the control logic is configured to insert the first MAC address into the source MAC field such that at least one node of the network learns the first MAC address based on the first ARP message,
wherein the network switching element has a first port coupled to the communication module, a second port coupled to the control logic, and a third port coupled to the network, the network switching element configured to receive a plurality of data messages and at least a second ARP message from the network, wherein each of the data messages has a header comprising a source MAC field in which the first MAC address is inserted, wherein the second ARP message has a header comprising a source MAC field in which the first MAC address is inserted, and wherein the network switching element is configured to forward each of the data messages to the first port and to forward the second ARP message to the second port based on a message type indicated by the second ARP message.

19. The system of claim 18, wherein the network layer address identifying the remote network device is an Internet Protocol (IP) address.

20. The system of claim 18, wherein the first ARP message is an ARP request.

21. The system of claim 18, wherein the first ARP message is an ARP reply.

22. The system of claim 18, wherein the network is an Ethernet network.

23. The system of claim 18, wherein the network switching element is configured to disallow station movement towards the second port.

24. The system of claim 18, wherein the network module comprises memory, and wherein at least a portion of the control logic is stored in the memory.

25. A communication method, comprising:
providing a network apparatus having a plurality of communication modules, control logic, and a network switching element, the control logic having a link layer address identifying the control logic and each of the communication modules having a respective link layer address identifying the communication module;
communicating with a network via one of the communication modules through the network switching element;
transmitting, from the control logic through the network switching element to the network, a first address resolution protocol (ARP) message for resolving a network layer address identifying a remote network device into a link layer address identifying the remote network device, wherein the first ARP message has a header comprising a source address field indicating a source address for the first ARP message;
inserting, via the control logic, the link layer address identifying one of the communication modules into the source address field of the first ARP message, thereby enabling at least one node of the network to learn the link layer address identifying the one communication module based on the first ARP message;
receiving at the network switching element from the network a plurality of data messages and at least a second ARP message, wherein each of the data messages has a header comprising a source address field in which the link layer address identifying the one communication module is inserted, and wherein the second ARP message has a header comprising a source address field in which the link layer address identifying the one communication module is inserted;

forwarding each of the data messages from the network switching element to the one communication module; and forwarding the second ARP message from the network switching element to the control logic based on a message type indicated by the second ARP message.

26. The communication method of claim 25, further comprising disallowing station movement towards of a port of the network switching element coupled to the control logic.

27. The communication method of claim 25, wherein the link layer address identifying the remote network device is a media access control (MAC) address.

28. The communication method of claim 27, wherein the network layer address identifying the remote network device is an Internet Protocol (IP) address.

29. The communication method of claim 25, wherein the network apparatus comprises memory, and wherein at least a portion of the control logic is stored in the memory.

\* \* \* \* \*